United States Patent [19]

Steele, Jr.

[11] 4,085,775
[45] Apr. 25, 1978

[54] THREE PORT VALVE CONSTRUCTION AND METHOD OF MAKING THE SAME

[75] Inventor: Everett T. Steele, Jr., Knoxville, Tenn.

[73] Assignee: Robertshaw Controls Company, Richmond, Va.

[21] Appl. No.: 686,472

[22] Filed: May 14, 1976

[51] Int. Cl.² .............................................. F16K 11/02
[52] U.S. Cl. .............................. 137/625.5; 137/625.27; 251/359; 29/157.1 R
[58] Field of Search ..................... 137/625.5, 625.27; 236/100; 251/359; 29/157.1

[56] References Cited

U.S. PATENT DOCUMENTS

| 3,329,165 | 7/1967 | Lang | 137/625.5 |
|---|---|---|---|
| 3,503,377 | 3/1970 | Beatenbough | 123/117 A |
| 3,913,887 | 10/1975 | Siepmann | 251/359 X |
| 3,930,515 | 1/1976 | Kennedy et al. | 123/117 A X |
| 3,960,124 | 6/1976 | Payne | 123/117 A |
| 3,961,606 | 6/1976 | Wong | 251/11 X |
| 3,989,058 | 11/1976 | Jackson et al. | 251/11 X |

*Primary Examiner*—Arnold Rosenthal
*Attorney, Agent, or Firm*—Candor, Candor & Tassone

[57] ABSTRACT

A three port valve construction having a onepiece plastic valve housing body provided with a stepped cylindrical opening through one end thereof that defines a pair of spaced annular shoulders, the body having three ports therein transversely disposed to the opening and respectively intersecting with the opening with one port being located between the shoulders and the other two ports being respectively disposed outboard of the shoulders. One of the shoulders defines a first valve seat and an annular plastic valve seat member is ultrasonically welded to the other of the shoulders to define a second valve seat. An axially movable valve member is slidingly disposed in the opening to control the first and second valve seats.

8 Claims, 2 Drawing Figures

THREE PORT VALVE CONSTRUCTION AND METHOD OF MAKING THE SAME

This invention relates to an improved three port valve construction and method of making the same.

It is well known to provide a three port valve construction formed from a metallic housing body having a stepped bore provided therein and receiving two spaced valve seat members for forming a pair of valve seats therein to be controlled by a valve member slidingly disposed within the valve body.

It is a feature of this invention to provide an improved three port valve construction of the above type by making the valve body from plastic material so that one of the valve seat members can be eliminated and the other valve seat member can be ultrasonically welded in place.

In particular, one embodiment of this invention provides a three port valve construction having a one-piece plastic valve housing body provided with a stepped cylindrical opening through one end thereof that defines a pair of spaced annular shoulders, the body having three ports thereon transversely disposed to the opening and respectively intersecting with the opening with one port being located between the shoulders and the other two ports being respectively disposed outboard of the shoulders. One of the shoulders defines a first valve seat. An annular plastic valve seat member is ultrasonically welded to the other of the shoulders to define a second valve seat. An axially movable valve member is slidingly disposed in the opening to control the first and second valve seats.

Accordingly, it is an object of this invention to provide an improved three port valve construction having one or more of the novel features set forth above or hereinafter shown or described.

Another object of this invention is to provide a method of making a three port valve construction, the method of this invention having one or more of the novel features set forth above or hereinafter shown or described.

Other objects, uses and advantages of this invention are apparent from a reading of this description which proceeds with reference to the accompanying drawings forming a part thereof and wherein.

Figure 1:
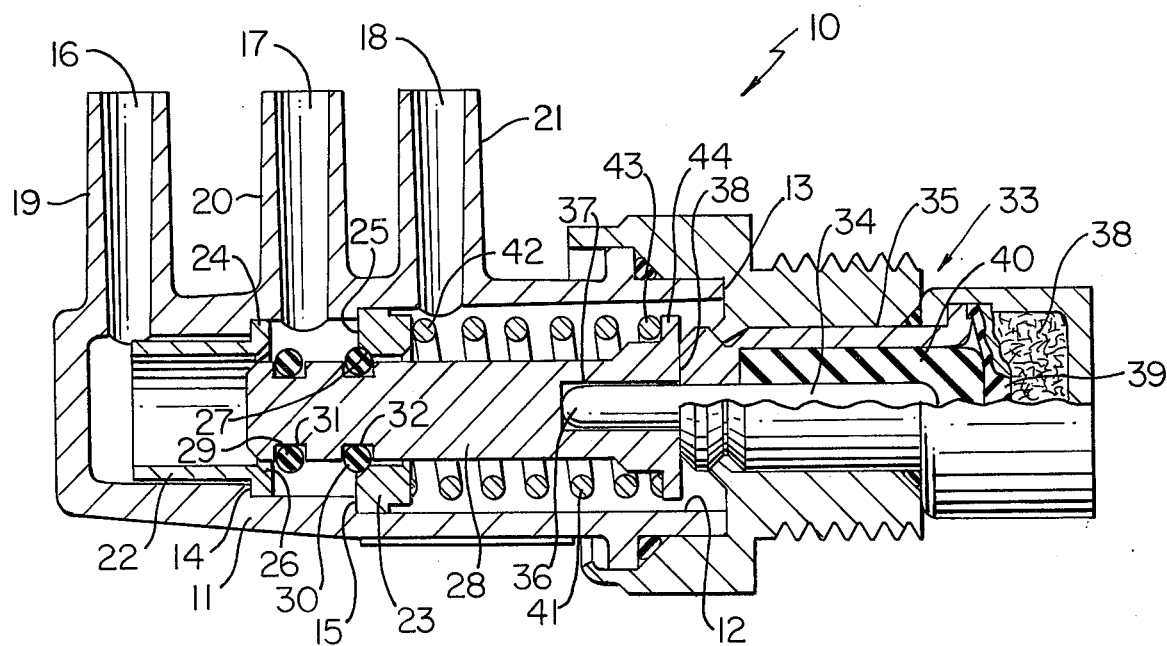
FIG. 1 is a cross-sectional view of a prior known three port valve construction.

While the various features of this invention are hereinafter described and illustrated as being particularly adapted to provide a thermostatically operated valve construction, it is to be understood that the various features of this invention can be utilized singly or in any combination thereof to provide a valve construction operated by other devices as desired.

Therefore, this invention is not to be limited to only the embodiment illustrated in the drawings, because the drawings are merely utilized to illustrate one of the wide variety of uses of this invention.

Referring now to FIG. 1, a prior known three port valve construction is generally indicated by the reference numeral 10 and comprises a one-piece metallic valve body 11 having a stepped cylindrical opening 12 interrupting one end 13 thereof and defining a pair of spaced annular shoulders 14 and 15 therein. The valve body 11 has three ports 16, 17 and 18 formed therein transverse to the opening 12 and intersecting therewith while being respectively located in outwardly directed integral nipples 19, 20 and 21 of the valve body 11, the port 20 being intermediate the annular shoulders 14 and 15 and the ports 16 and 18 being respectively disposed outboard of the annular shoulders 14 and 15 as illustrated.

A pair of metallic valve seat inserts or members 22 and 23 are respectively press-fitted into the valve body opening 12 with the insert 22 having an outwardly directed annular flange 24 disposed in abutting relation with the annular shoulder 14 while the other valve seat insert 23 has a surface 25 disposed in abutting relation with the annular shoulder 15. When the valve body 11 is formed of zinc, the inserts 22 and 23 can be formed of aluminum material and are respectively secured in place to respectively define first and second annular valve seats 26 and 27 respectively adapted to lead from the intermediate port 17 to the outboard ports 16 and 18 depending upon the position of a movable valve member 28 slidingly disposed in the opening 12 and carrying a pair of spaced annular O-rings 29 and 30 in annular groooves 31 and 32 thereof as illustrated.

A thermostatically operated actuator unit 33 is secured to the open end 13 of the valve body 11 and comprises a piston member 34 projecting out of a cylinder member 35 and having its end 36 received within an opening 37 in one end 38 of the valve member 28.

The cylinder 35 of the thermostatically operated actuator 33 includes a wax charge 38 which will expand upon reaching a certain temperature and through a diaphragm 39 and rubber amplifier member 40, in a manner well known in the art, move the piston 34 to the left in FIG. 1 and thereby move the O-ring 29 of the valve member 28 against the valve seat 26 to disconnect the port 17 from the port 16 while interconnecting the port 17 to the port 18 through the now opened valve seat 27. Conversely, when wax charge 38 contracts by sensing a temperature below the certain temperature, the valve member 28 and piston 34 move to the right in FIG. 1 under the force of the compression spring 41 having one end 42 bearing against the insert 23 and the other end 43 thereof bearing against an annular flange 44 of the valve member 28 at the end 38 thereof to move the O-ring 30 into sealing engagement with the valve seat 27 whereby the port 17 will be disconnected from the port 18 and the port 17 is interconnected to the port 16 through the now opened valve seat 26 in the manner illustrated in FIG. 1.

Figure 2:
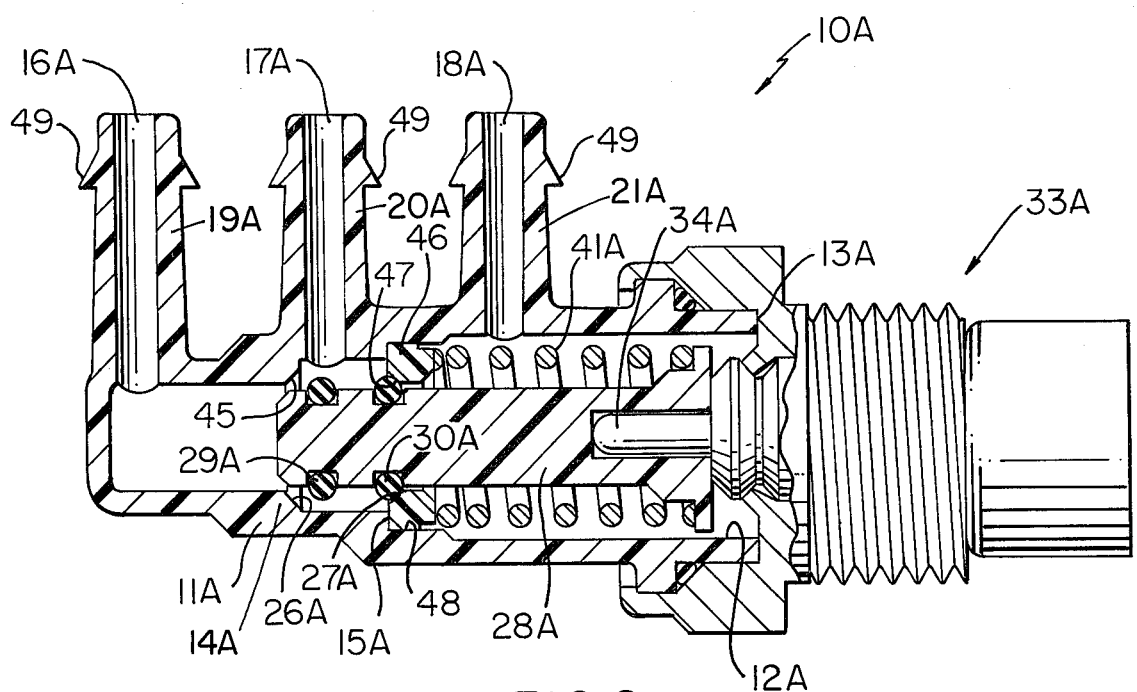
FIG. 2 is a view similar to FIG. 1 and illustrates the three port valve construction of this invention.

The valve construction of this invention is generally indicated by the reference numeral 10A in FIG. 2 and parts thereof similar to the valve construction 10 previously described are indicated by like reference numerals followed by the reference letter "A".

It can be seen that in the three port valve construction 10A of this invention, the valve body 11A is formed of plastic material, such as glass-filled nylon, molded into the configuration illustrated and being suitably cored to define the stepped opening 12A and ports 16A, 17A and 18A for the purpose previously described.

However, the annular shoulder 14A is suitably beveled at the inner edge 45 thereof to define the first valve seat 26A without requiring the insert 22 of the valve construction 10 previously described and the shoulder 14A has a smaller diameter than the diameter of the shoulder 15A.

Further, a plastic annular valve seat member 46 is disposed in the opening 12A to seat against the other annular shoulder 15A of the valve body 11A to define at an annular beveled edge 47 thereof the second valve seat 27A of the valve construction 10A. In order to secure the annular valve seat member 46 in place, an ultrasonic horn can be inserted through the open end 13A of the valve body 11A and engage against the valve seat member 46 to ultrasonically weld the same to the shoulder 15A and to the surface 48 of the valve body 11A since the valve seat member 46 and valve body 11A are formed of plastic material, the valve seat member 46 being formed of the aforementioned glass-filled nylon materials, if desired.

In this manner, the complicated sealing operation between the aluminum inserts 22 and 23 of the valve construction 10 and its zinc metallic body 11 are eliminated by this invention as a simple ultrasonic welding operation can be utilized to form the valve seat means 27A while an integral shoulder 14A of the valve body 11A forms the other valve seat 26A, the valve seats 26A and 27A having substantially the same size diameters in their completed form.

If desired, the valve member 28A of the valve construction 10A can also be formed of plastic material. However, the remainder of the thermostatically operated unit 33A of the valve construction 10A of this invention is substantially identical to the thermostatically operated unit 33 of the valve construction 10 previously described.

By forming the body 11A of plastic material, it can be seen that the same can be readily molded with annular barb means 49 on the nipples 19A, 20A and 21A thereof to facilitate holding flexible conduits thereto. Also, it has been found that the plastic valve body 11A can be cored completely when forming the ports 16A, 17A and 18A and opening 12A in the configuration illustrated in FIG. 2 and thereby eliminate the drilling and reaming operations necessary to form the similar parts in the zinc body 11 of the valve construction 10. Also, the plastic valve body 11A permits uniform color to be obtained in the plastic material at no extra cost which eliminates costly dieing operations on the zinc bodies 11.

In addition, it has been found that improved corrosion resistance is provided by the plastic material and the plastic parts are less expensive than the metallic parts of the valve construction 10.

Thus, it can be seen that the valve construction 10A of this invention can be formed in a relatively simple manner by the method of this invention to operate in a manner now to be described.

As previously stated, when the thermostatically operated device 33A senses a temperature above a certain temperature, the piston 34A thereof is moved to the left in FIG. 2 to carry the valve member 28A therewith in opposition to the force of the compression spring 41A to move the O-ring 29A against the valve seat 26A to close the port 17A from the port 16A while opening the port 17A to the port 18A through the now opened valve seat 27A. Conversely, when the temperature sensed by the device 33A falls below that certain temperature, the compression spring 41A moves the valve member 28A and piston 34A to the right to cause the O-ring 30A to seat against the valve seat 27A to disconnect the port 17A from the port 18A while interconnecting the port 16A to the port 17A through the now opened valve seat 26A.

Thus, it can be seen that this invention provides an improved three port valve construction and method of making the same.

While the form and method of this invention now preferred have been illustrated and described as required by the Patent Statute, it is to be understood that other forms and method steps can be utilized and still fall within the scope of the appended claims.

What is claimed is:

1. A three port valve construction comprising a one-piece plastic valve housing body having a stepped cylindrical opening through one end thereof that defines a pair of spaced annular shoulders, said body having three ports therein transversely disposed to said opening and respectively intersecting with said opening with one port being located between said shoulders and the other two ports being respectively disposed outboard of said shoulders, one of said shoulders being beveled and defining a first valve seat, an annular plastic valve seat member ultrasonically welded to the other of said shoulders to define a second valve seat, and an axially movable valve member slidingly disposed in said opening to control said first and second valve seats, said body having three integral nipples extending outwardly therefrom and respectively having said ports therethrough, said nipples each having integral annular barb means thereon.

2. A three port valve construction as set forth in claim 1 wherein said other annular shoulder has a larger diameter than the diameter of said one annular shoulder.

3. A three port valve construction as set forth in claim 2 wherein said annular valve seat member has a diameter substantially the same as the diameter of said one valve seat whereby said first and second valve seats have substantially the same diameters.

4. A three port valve construction as set forth in claim 1 and including a thermostatically operated actuator carried at said one end of said body and being operatively interconnected to said valve member to move the same in response to sensed temperature conditions.

5. A method of making a three port valve construction comprising the steps of forming a one-piece plastic valve housing body with a stepped cylindrical opening through one end thereof to define a pair of spaced annular shoulders in said body, forming said body with three ports therein transversely disposed to said opening and respectively intersecting with said opening with one port being located between said shoulders and the other two ports being respectively disposed outboard of said shoulders, forming said body with three integral nipples extending outwardly therefrom and respectively having said ports therethrough, forming each of said nipples with integral annular barb means thereon, beveling one of said shoulders so that the same defines a first valve seat, ultrasonically welding an annular plastic valve seat member to the other of said shoulders to define a second valve seat, and disposing an axially movable valve member in said opening to control said first and second valve seats.

6. A method of making a three port valve construction as set forth in claim 5 and including the step of forming said other annular shoulder with a larger diameter than the diameter of said one annular shoulder.

7. A method of making a three port valve construction as set forth in claim 6 and including the step of forming said annular valve seat member with a diameter substantially the same as the diameter of said one valve seat whereby said first and second valve seats have substantially the same diameters.

8. A method of making a three port valve construction as set forth in claim 5 and including the step of securing a thermostatically operated actuator at said one end of said body, and operatively interconnecting said actuator to said valve member to move the same in response to sensed temperature conditions.

* * * * *